United States Patent [19]

Vargo

[11] 4,328,275

[45] May 4, 1982

[54] DISPOSABLE FLOOR MAT

[76] Inventor: Louis M. Vargo, 504 W. 24th St., Covington, La. 70433

[21] Appl. No.: 185,665

[22] Filed: Sep. 10, 1980

[51] Int. Cl.³ .......................... B32B 3/30; B32B 5/02
[52] U.S. Cl. ........................................ 428/156; 4/581; 428/167; 428/172; 428/182; 428/192; 428/195
[58] Field of Search .............. 428/180, 181, 182, 184, 428/186, 167, 192, 195, 905, 156, 172, 8, 83; 4/581, 582, 583, 584, 222; 15/238

[56] References Cited

U.S. PATENT DOCUMENTS 2,251,372 8/1941 Nicholson .......................... 428/138
4,125,656 11/1978 Creamer .............................. 428/181

FOREIGN PATENT DOCUMENTS 2801636 7/1979 Fed. Rep. of Germany ...... 428/905

OTHER PUBLICATIONS

Pages 739, 741 of Thomas Register Catalog File.

Primary Examiner—Paul J. Thibodeau
Attorney, Agent, or Firm—Senniger, Powers, Leavitt and Roedel

[57] ABSTRACT

A disposable floor mat for bathrooms and the like comprising a sheet of liquid absorbent matting having raised portions for supporting a person's feet. These raised portions have a liquid repellent coating thereon for maintaining the feet relatively dry as liquid falling onto the mat is absorbed by the matting.

7 Claims, 5 Drawing Figures

DISPOSABLE FLOOR MAT

BACKGROUND OF THE INVENTION

This invention relates to a floor mat, and more particularly to a disposable floor mat for bathrooms, hospital operating rooms, and the like.

Water, urine and other liquids splashed on the floor of a bathroom, particularly in the area of toilets or urinals, tend to form a film over the floor which is unsanitary, unattractive in appearance, and which typically gives off an unpleasant odor. Moreover, the liquid may make the floor slippery thereby posing a safety hazard. Similarly, blood and other body fluids falling on the floor of a hospital operating room form an undesirable film which presents health and safety problems. Various types of floor mats have been used to avoid or at least minimize these problems. Typically these mats are constructed of a fluid-impervious, durable material such as rubber designed to have a relatively long useful life. However, these mats must be properly and regularly cleaned, which is an unpleasant and thus an often neglected task. If they are not cleaned, as is frequently the case, they too can become unattractive, unsanitary and slippery.

SUMMARY OF THE INVENTION

Among the several objects of this invention may be noted the provision of an absorbent floor mat for bathrooms, hospital operating rooms and the like; the provision of such a floor mat which is relatively inexpensive and hence disposable; the provision of such a floor mat which is impregnated with a sanitizing agent for sanitizing liquids absorbed by the mat; the provision of such a mat having a corrugated upper surface for supporting a person's feet on the mat, maintaining them relatively dry, and providing good traction; and the provision of such a floor mat which has a substantially liquid-impervious material on its underside to prevent liquid absorbed by the mat from seeping through the mat and wetting the floor.

In general, a disposable floor mat of this invention comprises a sheet of liquid absorbent matting having raised portions for supporting a person's feet. These raised portions have a liquid repellent coating thereon for maintaining feet on the mat relatively dry as liquid falling onto the mat is absorbed by the matting. Other objects and features will be in part apparent and in part pointed out hereinafter.

BRIEF DESCRIPTION OF THE DRAWINGS

Corresponding reference characters indicate corresponding parts throughout the several views of the drawings.

DESCRIPTION OF PREFERRED EMBODIMENTS

Figure 2:
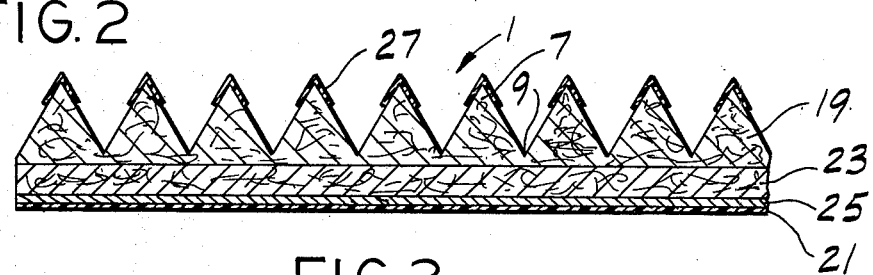
FIG. 2 is an enlarged section on line 2—2 of FIG. 1.
Figure 3:
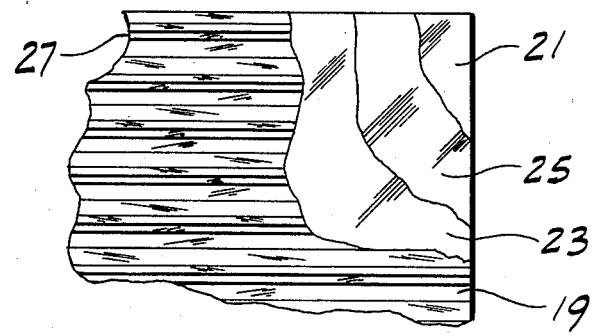
FIG. 3 is an enlarged portion of FIG. 1 with portions broken away for purposes of illustration.
Figure 4:
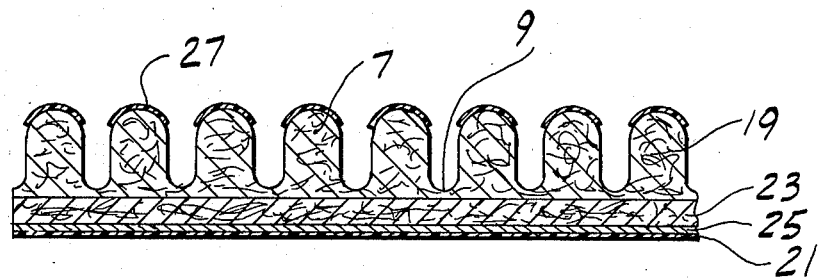
FIG. 4 is an enlarged section similar to FIG. 2 of a mat of alternative construction.

Referring now to the drawings, a disposable floor mat of this invention is designated in its entirety by the reference numeral 1 and depressed portions or is shown as comprising a sheet of liquid absorbent matting 3, the top surface of which is corrugated, having formed therein a multiplicity of alternate rows of raised portions or ridges 7 and grooves 9. As shown in FIG. 2, the tops of the ridges 7 are generally of inverted-V shape and the bottoms of grooves 9 are generally V-shaped. It is contemplated, however, that the ridges 7 may have rounded tops and that grooves 9 may have rounded bottoms, as shown in FIG. 4. In either case, the ridges 7 are of a material which is sufficiently rigid and incompressible to support a person's feet (or other objects) thereon with the tops of the ridges providing a "traction surface" for the feet. In addition, the corrugations enable the mat, which is preferably ⅛ to 3/16 inch thick, to be readily rolled up for compact storage and handling.

As best illustrated in FIG. 2, the matting 3 comprises four layers—a top layer 19, a bottom layer 21 and upper and lower intermediate layers designated 23 and 25, respectively. More specifically, the top layer 19 is of a porous, relatively rigid and substantially incompressible material (e.g., a mixture of cellulose fibers and dialdehyde starch, such as that available from National Starch Products, Inc. of New Jersey, or starch-polyethylene or starch-polyester copolymers) having corrugations (i.e., ridges 7 and grooves 9) formed therein. The starch and/or resin components assist in providing a relatively strong matrix of the cellulose fibers. The upper intermediate layer 23 is of a suitable liquid absorbent material such as an acrylamide modified starch and cellulose mixture or a mixture of cellulose and a starch graft polymer (e.g., polyacrylonitrile grafted to the glucose molecule of starch) such as that sold under the trade designation "Super-Slurper" by Henkel, Inc. of Hoboken, N.J.). The lower intermediate layer 25 is preferably of a cellulosic fibrous material, such as that sold under the trade designation "Solka-Floc" by the Brown Co. of New York, or available under the trade designation "Avicel" from FMC Corp. of Philadelphia, Pa. This layer serves as an interface and bond between the bottom sheet or film layer 21 and layer 23. The bottom layer 21 which constitutes the bottom or underside of the mat, is substantially flat and of a material which is substantially impervious to liquid, preferably a polyethylene or a polyester film, such as that sold under the trade designation "Mylar" by E. I. du Pont De Nemours Co., of Wilmington, Del.

As indicated at 27, the tops of ridges 7 are coated with a suitable liquid or water repellent, such as a silicone-polyester and silicone-alkyd materials (e.g., a "Siliclad" available from Dow Corning Corporation of Midland, Mich., or "Scotchguard" available from MMM of St. Paul, Minn., or SE-30 and SE-52 available from General Electric Company of Waterford, N.Y.). This coating 27 directs and diverts liquid (urine or blood, for example) falling onto the mat 1 down toward the bottoms of grooves 9 where the liquid is readily absorbed by the upper intermediate layer 23 of the matting. Thus, a person's feet may be supported on the ridges without being wetted by liquid which has fallen on and been absorbed by the mat. To avoid any sanitation problems the liquid absorbent layer 23 is impregnated with a suitable sanitizing agent, such as chlorophenol, for disinfecting, deodorizing and generally sanitizing liquids absorbed by the matting. One such agent is that sold under the trade designation "Lysol" by Sterling Drug, Inc. of Mount Vaille, N.J. The substantially liquid-impervious bottom layer 21 of the matting prevents seepage through the mat to the floor.

Figure 1:
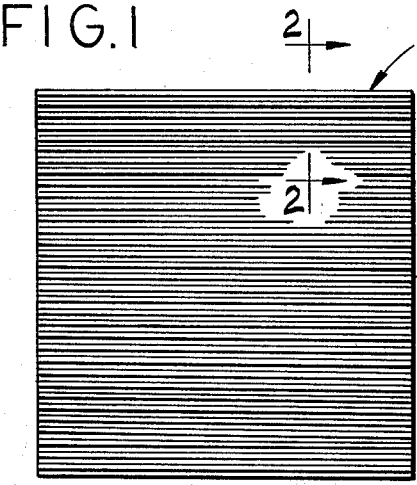
FIG. 1 is a top plan of a disposable floor mat of this invention.
Figure 5:
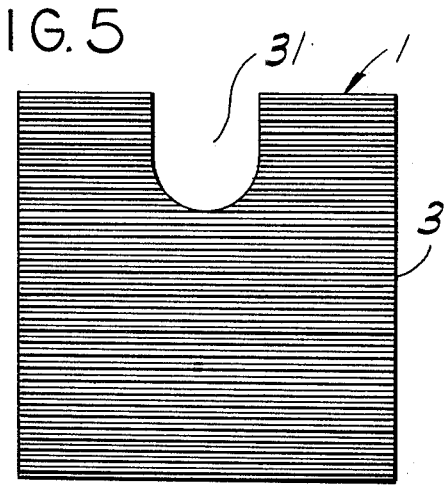
FIG. 5 is a top plan of a mat of another alternative construction having a notch in one side thereof.

A mat of the present invention may be of any shape and size depending on the particular application. The mat shown in FIG. 1, for example, is generally rectangular in shape and is suitable for use beneath a wall-mounted urinal, or adjacent an operating table. The mat shown in FIG. 5 is also generally rectangular but has a notch 31 in one side, making it especially suitable for use with floor-mounted toilets, the curved base of the toilet being received in the notch.

It will be apparent from the foregoing that a disposable floor mat of this invention may be positioned in any desirable location for absorbing spillage, such as on the floor adjacent an operating table in a hospital operating room or on the floor adjacent a toilet or urinal in a bathroom. Any liquid falling on the mat is deflected by the liquid-repellent coating 27 on the tops of the ridges 7 of the mat down to the bottoms of grooves 9 where the liquid is absorbed by the liquid absorbent layer 23. And since the ridges are sufficiently incompresible to support a person's feet above the bottom of grooves 9, the feet are kept dry. The tops of the raised portions 7 also provide excellent traction for the feet. It will also be observed that the bottom layer 21 of the mat presents a substantially liquid-impervious barrier to moisture absorbed by the mat, thereby preventing it from seeping through to the underside of the mat. Thus the floor beneath the mat also remains dry. Moreover, because of its relatively low cost, the mat can be disposed of and replaced with another mat whenever necessary, thereby eliminating the inconvenience and cost of cleaning.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A disposable floor mat for bathrooms and the like comprising a sheet of liquid absorbent matting having a top surface, a bottom surface, and a multiplicity of raised portions and depressed portions distributed over substantially the entire top surface of the matting, said raised portions having a liquid repellent coating thereon for deflecting liquid falling onto the mat down onto said depressed portions for being absorbed by the matting, said raised portions being of a substantially rigid substantially incompressible material for supporting the feet of a person standing on the mat above said depressed portions whereby the feet of the person are maintained relatively dry.

2. A disposable floor mat as set forth in claim 1 wherein said bottom surface comprises a layer of substantially liquid-impervious material.

3. A disposable floor mat as set forth in claim 1 wherein the top surface of said matting is corrugated, having formed therein alternate rows of ridges, constituting said raised portions, and grooves, constituting said depressed portions.

4. A disposable floor mat as set forth in claim 3 wherein the tops of said ridges and the bottoms of said grooves are rounded.

5. A disposable floor mat as set forth in claim 3 wherein the tops of said ridges are generally of inverted-V shape and the bottoms of said grooves are generally V-shaped.

6. A disposable floor mat as set forth in claim 1 wherein said matting is impregnated with a sanitizing agent, liquid falling onto the mat being sanitized by said matting.

7. A disposable floor mat as set forth in claim 1 wherein said sheet of matting is generally rectangular and has a notch in one side thereof.

* * * * *